United States Patent
Yao et al.

(10) Patent No.: US 11,983,932 B1
(45) Date of Patent: May 14, 2024

(54) VISION ACQUISITION SYSTEM EQUIPPED IN INTELLIGENT TERMINAL OF SMART LOGISTICS VEHICLE

(71) Applicant: New Automobile Co., Ltd, Beijing (CN)

(72) Inventors: Jinli Yao, Beijing (CN); Shengrong Mi, Beijing (CN); Weipeng Guo, Beijing (CN); Chunqing Wang, Beijing (CN)

(73) Assignee: New Automobile Co., Ltd, Beijing (CN)

( * ) Notice: Subject to any disclaimer, the term of this patent is extended or adjusted under 35 U.S.C. 154(b) by 0 days.

(21) Appl. No.: 18/484,992

(22) Filed: Oct. 11, 2023

Related U.S. Application Data

(63) Continuation of application No. PCT/CN2023/119078, filed on Sep. 15, 2023.

(30) Foreign Application Priority Data

Jul. 28, 2023 (CN) .......................... 202310936575.3

(51) Int. Cl.
| | | |
|---|---|---|
| *G06V 20/56* | (2022.01) | |
| *G06T 7/70* | (2017.01) | |
| *G06T 7/80* | (2017.01) | |

(52) U.S. Cl.
CPC ............... *G06V 20/56* (2022.01); *G06T 7/70* (2017.01); *G06T 7/80* (2017.01); *G06T 2207/30248* (2013.01)

(58) Field of Classification Search
CPC ...... G06V 20/56; G06V 20/58; G06V 20/588; G06T 7/70–77; G06T 7/80–85; G06T 2207/30248–30261
See application file for complete search history.

(56) References Cited

U.S. PATENT DOCUMENTS 5,559,695 A * 9/1996 Daily .................. G01S 11/12
  701/1
2013/0069773 A1 3/2013 Li et al.
(Continued)

FOREIGN PATENT DOCUMENTS

| CN | 111546891 A | 8/2020 |
| CN | 113256965 A | 8/2021 |

(Continued)

OTHER PUBLICATIONS

Raja, Gunasekaran, et al. "SPAS: Smart Pothole-Avoidance Strategy for Autonomous Vehicles." IEEE Transactions on Intelligent Transportation Systems 23.10 (2022): 19827-19836. (Year: 2022).*

(Continued)

*Primary Examiner* — Geoffrey E Summers

(57) ABSTRACT

A vision acquisition system equipped in an intelligent terminal of a smart logistics vehicle is disclosed. The vision acquisition system includes an image information acquisition unit, an angle information acquisition unit, a vehicle information acquisition unit, an image information analysis unit and a calculation unit. The image information acquisition unit includes a ground image acquisition module and a feature point identification module; the ground image acquisition module acquires a ground image in front of a vehicle through a camera; and the feature point identification module is used for identifying contour information of the image and mark a near point and a far point of the image. In implementation of the present invention, a road surface in front of the driving vehicle can be acquired.

3 Claims, 2 Drawing Sheets

(56) References Cited

U.S. PATENT DOCUMENTS

| | | | | |
|---|---|---|---|---|
| 2016/0339959 | A1* | 11/2016 | Lee | G06V 20/588 |
| 2017/0243370 | A1* | 8/2017 | Hoye | G06T 7/73 |
| 2017/0285649 | A1* | 10/2017 | Debreczeni | G05D 1/0246 |
| 2020/0290624 | A1* | 9/2020 | Kumano | B60W 10/20 |
| 2022/0074761 | A1* | 3/2022 | Sano | G01C 21/3691 |
| 2022/0281456 | A1* | 9/2022 | Giovanardi | G01S 17/931 |
| 2022/0332306 | A1* | 10/2022 | Noma | B60G 17/0195 |

FOREIGN PATENT DOCUMENTS

| | | |
|---|---|---|
| CN | 113574524 A | 10/2021 |
| CN | 113989775 B | 8/2022 |
| CN | 114913449 A | 8/2022 |
| CN | 115273023 A | 11/2022 |
| CN | 218782601 U | 3/2023 |
| CN | 115892063 A | 4/2023 |

OTHER PUBLICATIONS

Fox, Andrew, et al. "Multi-lane pothole detection from crowdsourced undersampled vehicle sensor data." IEEE Transactions on Mobile Computing 16.12 (2017): 3417-3430. (Year: 2017).*

Karuppuswamy, Jaiganesh, et al. "Detection and avoidance of simulated potholes in autonomous vehicle navigation in an unstructured environment." Intelligent Robots and Computer Vision XIX: Algorithms, Techniques, and Active Vision. vol. 4197. SPIE, 2000. (Year: 2000).*

Kuan, Chi-Wei, Wen-Hui Chen, and Yu-Chen Lin. "Pothole detection and avoidance via deep learning on edge devices." 2020 International Automatic Control Conference (CACS). IEEE, 2020. (Year: 2020).*

Rosyid, Harits Ar, et al. "Comparison of deep learning models in pothole avoidance for self-driving car." 2021 7th International Conference on Electrical, Electronics and Information Engineering (ICEEIE). IEEE, 2021. (Year: 2021).*

Schiopu, Ionut, et al. "Pothole detection and tracking in car video sequence." 2016 39th International Conference on Telecommunications and Signal Processing (TSP). IEEE, 2016. (Year: 2016).*

Zhang, Fuzeng, and Askar Hamdulla. "Research on Pothole Detection Method for Intelligent Driving Vehicle." 2022 3rd International Conference on Pattern Recognition and Machine Learning (PRML). IEEE, 2022. (Year: 2022).*

Wang Ping, Xiao Guoyan, Xie Daiyan, Segmentation of occluded vehicles based on concavity analysis of contour feature points [J], Science Technology and Engineering, Jan. 18, 2018 (2).

* cited by examiner

US 11,983,932 B1

VISION ACQUISITION SYSTEM EQUIPPED IN INTELLIGENT TERMINAL OF SMART LOGISTICS VEHICLE

CROSS-REFERENCE TO RELATED APPLICATIONS

This application is a continuation of International Patent Application No. PCT/CN2023/119078 with a filing date of Sep. 15, 2023, designating the United States, now pending, and further claims priority to Chinese Patent Application No. 202310936575.3 with a filing date of Jul. 28, 2023. The content of the aforementioned applications, including any intervening amendments thereto, are incorporated herein by reference.

TECHNICAL FIELD

The present invention belongs to the technical field of an auxiliary control system of vehicles, and particularly relates to a vision acquisition system equipped in an intelligent terminal of a smart logistics vehicle.

BACKGROUND OF THE PRESENT INVENTION

For vehicles, especially unmanned vehicles for carrying goods in factories, in order to reduce the cost, more and more vehicles adopt a driverless technology. The existing unmanned vehicles can make effective judgment if encountering pedestrians or obstacles during driving. However, the existing unmanned technology cannot effectively judge an uneven road surface during the driving. Therefore, the present application provides a vision acquisition system equipped in an intelligent terminal of a smart logistics vehicle.

SUMMARY OF PRESENT INVENTION

In view of the above situation, in order to overcome defects of the prior art, the present invention provides a vision acquisition system equipped in an intelligent terminal of a smart logistics vehicle, which effectively solves the problems in the background.

In order to achieve the above purpose, the present invention provides the following technical solution: a vision acquisition system equipped in an intelligent terminal of a smart logistics vehicle includes an image information acquisition unit, an angle information acquisition unit, a vehicle information acquisition unit, an image information analysis unit and a calculation unit.

The image information acquisition unit includes a ground image acquisition module and a feature point identification module; the ground image acquisition module acquires a ground image in front of a vehicle through a camera; and the feature point identification module is used for identifying contour information of the image and marking a near point and a far point of the image.

The angle information acquisition unit includes an angle control module and an angle acquisition module; the angle control module is used for controlling an inclination angle of the camera; and the angle acquisition module is used for acquiring the inclination angle of the camera.

The vehicle information acquisition unit includes a vehicle speed control module, a vehicle speed acquisition module and a vehicle steering control module; the vehicle speed control module is used for controlling a speed of the vehicle, including braking and acceleration of the vehicle; the vehicle speed acquisition module is used for acquiring a real-time speed of the vehicle; and the vehicle steering control module is used for controlling the steering of the vehicle.

The image information analysis unit includes an image analysis module and a distance measurement module; the image analysis module is used for analyzing whether there is a pit on the ground image; and the distance measurement module is used for measuring distances from the near point and the far point to a front portion of the vehicle.

The calculation unit includes a vehicle speed calculation module and a camera inclination angle calculation module; the vehicle speed calculation module is used for calculating a driving speed of the vehicle, so that the vehicle can pass through the pit safely; and the camera inclination angle calculation module is used for calculating the inclination angle of the camera, so that the camera can acquire the satisfactory image.

Preferably, the image analysis module of the image acquisition module can also calibrate the pit on the ground, a calibration value is B, and threshold values are set as C1 and C2 according to a width of the pit;

When B≤C1, it means that the vehicle can pass through the pit without slowing down.

When C1<B<C2, it means that the vehicle can pass through the pit by slowing down.

When C2≤B, it means that the vehicle can bypass the pit by steering.

Preferably, when the vehicle can pass through the pit by slowing down, the near point is marked as a point A, and the far point is marked as a point B;

the distance from the point A to a front end of the vehicle is marked as H1;

the driving speed of the vehicle is marked as V1, and the speed of the vehicle safely passing through the pit is marked as V2;

a braking distance of the vehicle is marked as X;

so X≤H1;

A friction force provided by the vehicle is F, and the vehicle speed calculation module is internally preset with a following algorithm:

$$F1 = \frac{(V2 - V1)^2}{X} \times m,$$

wherein m is a mass of the vehicle, so that the friction force provided by the vehicle is that F≥F1.

Preferably, the camera inclination angle calculation module is preset with the following algorithm, $$H2 = \frac{V1^2}{F} \times m$$

wherein H2 is the distance from the front end of the vehicle to the point A when the vehicle speed is V1;

the camera inclination angle calculation module is also internally preset with the following algorithm, $$\cos\theta = \frac{b^2 + c^2 - H2^2}{2bc},$$

wherein b is a height of the camera from the ground;
c is a distance from the camera to the point A;
θ is an included angle between b and c, i.e., an included angle between the camera and a vertical direction.

The camera inclination angle calculation module is also internally preset with the following algorithm.

$$c = \sqrt{H2^2 + b^2},$$

and the angle control module controls the inclination angle of the camera to be not less than θ.

Preferably, the vision acquisition system further includes a storage module; the storage module is used for storing the information of a road surface in front of the vehicle, the information of the road surface includes a width and a depth of the pit and the information of the vehicle passing through the road surface, and the information of the vehicle includes speed information, steering information and weight information of the vehicle; each group of the speed information, the steering information and the weight information of the vehicle form a data set, and is stored in the storage module; the storage module is internally provided with a safety area, a transition area and a dangerous area; and vibration information when the vehicle passes through the road surface safely is calibrated, a calibration value is T0, and threshold values T1 and T2 are set, wherein T1<T2.

When T0≤T1, the information of the vehicle is stored in the safety area of the storage module.

When T1<T0<T2, the information of the vehicle is stored in the transition area of the storage module.

When T0≥T2, the information of the vehicle is stored in the dangerous area of the storage module.

Preferably, the vision acquisition system further includes a comparison module.

The vehicle weight acquisition module acquires weight information of the vehicle, and marks the weight information as m1.

The vehicle speed acquisition module acquires the speed information of the vehicle, and marks the speed information as V3.

The image acquisition module can acquire the distance from the front end of the vehicle to the point A, and marks the distance as H3.

When there is a pit in front of the vehicle, m1, V3 and H3 are compared with the data set in the storage module so as to output the data set information same as/similar to the data of the vehicle in the safety area, and the vehicle is controlled by the outputted data set information.

Preferably, the vision acquisition system further includes a feature selection module; the feature selection module is used for limiting the outputted data set information, including the data set information when the vehicle passes through the pit safely at the maximal speed, or the data set information when the vehicle passes through the pit safely with minimal vehicle vibration, or the data set information when the vehicle passes through the pit safely at a minimal steering angle.

Compared with the prior art, the present invention has the following beneficial effects:
 (1) In implementation of the present invention, the road surface in front of the vehicle can be acquired, and when the road surface is uneven and the vehicle needs to slow down, the vehicle can be slowed down in time so as to ensure that the vehicle can cross the uneven road surface stably or can bypass the uneven position, thereby ensuring that the system can help the vehicle to drive more stably in implementation;
 (2) By arranging the camera inclination angle calculation module, the inclination angle of the camera can be controlled, so that when the vehicle speed changes, the image of the road surface in front of the vehicle is acquired, and the vehicle is ensured to have a sufficient buffer distance;
 (3) By acquiring the vehicle data, the suitable data set information for the vehicle to pass through the front pit can be screened out by comparing the information of the vehicle with the data set information stored in the storage module so as to control the vehicle, thereby reducing the calculation amount of the calculation module.

DESCRIPTION OF THE DRAWINGS

The drawings are used to provide further understanding for the present invention and constitute part of the description. The drawings are used to explain the present invention together with the embodiments of the present invention, and do not constitute a limitation to the present invention. In the drawings.

DETAILED DESCRIPTION OF PREFERRED EMBODIMENTS

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
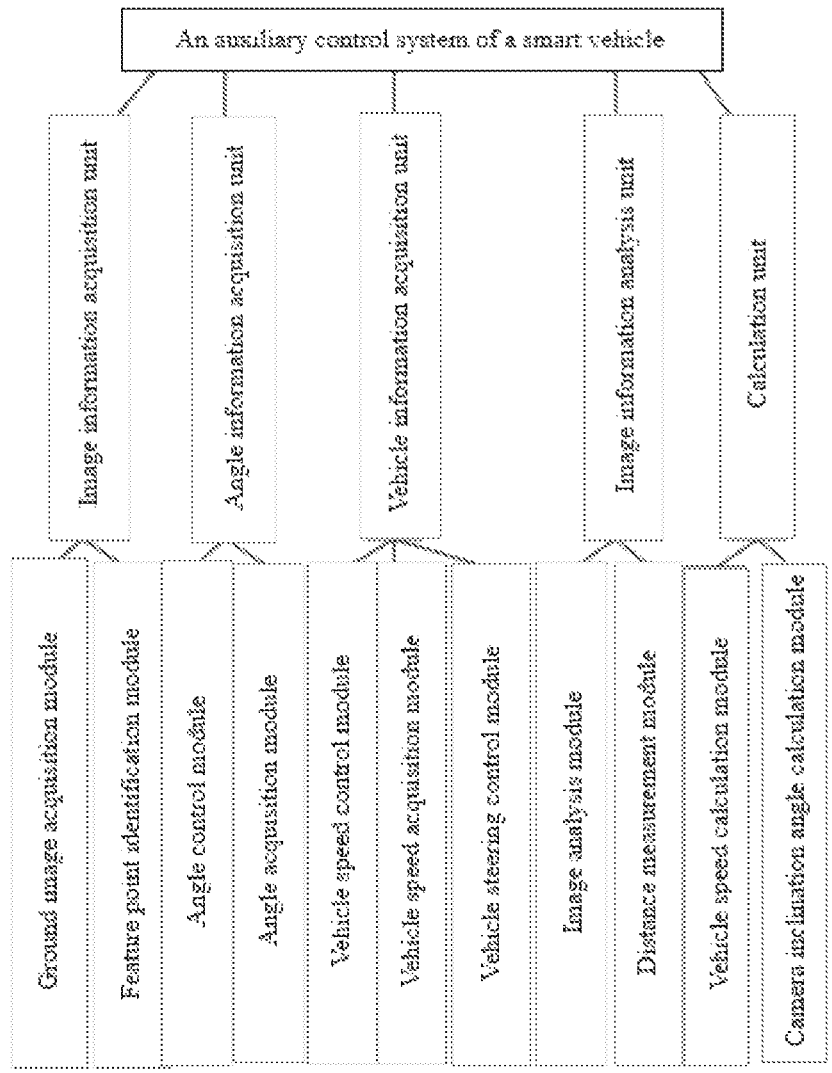
FIG. 1 is a block diagram of a vision acquisition system equipped in an intelligent terminal of a smart logistics vehicle.
Figure 2:
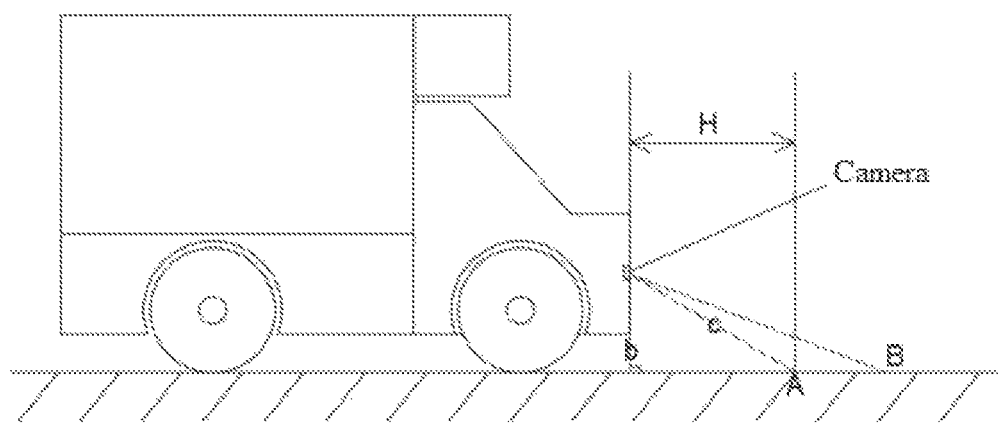
FIG. 2 is a structural schematic diagram of a vision acquisition system equipped in an intelligent terminal of a smart logistics vehicle.

As shown in FIG. 1 to FIG. 2, the present invention discloses a vision acquisition system equipped in an intelligent terminal of a smart logistics vehicle, comprising a camera and one or more processors configured for performing units comprising: an image information acquisition unit, an angle information acquisition unit, a vehicle information acquisition unit, an image information analysis unit and a calculation unit.

The image information acquisition unit includes a ground image acquisition module and a feature point identification module; the ground image acquisition module acquires a ground image in front of a vehicle through a camera; and the feature point identification module is used for identifying contour information of the image and marking a near point and a far point of the image. When the present solution is implemented, in order to accelerate the image processing, after the image is acquired, a segmentation unit can segment the image, so that the size of the image captured at every time is the same; and moreover, during the segmentation, the image of a point close to the vehicle needs to be reserved.

The angle information acquisition unit includes an angle control module and an angle acquisition module; the angle control module is used for controlling an inclination angle of a camera; and the angle acquisition module is used for acquiring the inclination angle of the camera. During the driving of the vehicle, in order to ensure that the vehicle can stop at an uneven position of a road surface, the angle of the camera needs to be controlled so as to judge a distance from the vehicle to the uneven position of the road surface, so that a speed of the vehicle is controlled, and the vehicle can pass through the uneven position of the road surface stably at a low speed.

The vehicle information acquisition unit includes a vehicle speed control module, a vehicle speed acquisition module, a vehicle weight acquisition module, and a vehicle steering control module; the vehicle speed control module is used for controlling the vehicle speed, including braking and acceleration of the vehicle; the speed vehicle acquisition module is used for acquiring a real-time speed of the vehicle; and the vehicle steering control module is used for controlling the steering of the vehicle. When the uneven road surface is acquired, the vehicle speed control module can control the speed of the vehicle, and the vehicle speed acquisition module can acquire the real-time speed of the vehicle, so that the image acquisition module can acquire the ground image at a suitable position.

The image information analysis unit includes an image analysis module and a distance measurement module; the image analysis module is used for analyzing whether there is an uneven road section on the ground image, for example, whether there is a pit; the distance measurement module is used for measuring distances from a near point and a far point to a front portion of the vehicle, that is, in an acquired image, the position close to the vehicle is a near point, and the position far from the vehicle is a far point.

The calculation unit includes a vehicle speed calculation module and a camera inclination angle calculation module; the vehicle speed calculation module is used for calculating a driving speed of the vehicle, so that the vehicle can pass through the pit safely; the camera inclination angle calculation module is used for calculating the inclination angle of the camera, so that the camera can acquire the satisfactory image; and when the vehicle speed increases, the inclination angle of the camera needs to change so as to ensure that the vehicle has a sufficient slow-down buffer distance.

The image analysis module of the image acquisition module can also calibrate the pit on the ground, a calibration value is B, and threshold values are set as C1 and C2 according to a width of the pit.

When B≤C1, it means that the vehicle can pass through the pit without slowing down, that is, the width of the pit is small, and when the vehicle passes through the pit, the vehicle may not be affected.

When C1<B<C2, it means that the vehicle needs to slow down to pass through the pit, and when the width of the pit is within the range, it means that the vehicle can pass through the pit by slowing down.

When C2≤B, it means that the vehicle can bypass the pit by steering.

When the vehicle needs to slow down to pass through the pit,
the near point is marked as a point A, and the far point is marked as a point B;
a distance from the point A to the front end of the vehicle is marked as H1;
a driving speed of the vehicle is marked as V1, and the speed of the vehicle safely passing through the pit is marked as V2;
a braking distance of the vehicle is marked as X;
so X≤H1.

That is, it is necessary to ensure that the near point of the image acquired by the camera needs to be greater than the braking distance of the vehicle.

A friction force provided by the vehicle is F, i.e. the friction force that can be provided by a brake disc. In specific implementation, the friction force is generally a range value. In order to better control the vehicle, an average friction force can be removed, so that the vehicle can be ensured to be decelerated to a preset value normally during the driving; and the vehicle speed calculation module is internally preset with the following algorithm, $$F1 = \frac{(V2 - V1)^2}{X} \times m,$$

wherein m is a mass of the vehicle.

That is, the friction force F provided by the vehicle is greater than or equal to F1, and when the friction force F provided by the vehicle is greater than or equal to F1, the vehicle can be decelerated to the preset value in front of the pit of the road surface.

Assuming that the vehicle stops moving in front of the pit of the road surface, the camera inclination angle calculation module is preset with the following algorithm, $$H2 = \frac{V1^2}{F} \times m,$$

wherein HL is me distance from the front end of the vehicle to the point A when the vehicle speed is V1.

The camera inclination angle calculation module is also internally preset with the following algorithm, $$\cos\theta = \frac{b^2 + c^2 - H2^2}{2bc},$$

wherein b is a height of the camera from the ground;
c is a distance from the camera to the point A;
θ is an included angle between b and c, i.e., an included angle between the camera and a vertical direction.

The camera inclination angle calculation module is also internally preset with the following algorithm, $$c = \sqrt{H2^2 + b^2},$$

and the angle control module controls the inclination angle of the camera to be not less than θ.

In some embodiments, in order to reduce the calculation amount of the calculation module, the following technical solutions are provided:

The vision acquisition system further includes a storage module; the storage module is used for storing the information of the road surface in front of the vehicle, the information of the road surface includes a width and a depth of the pit, and the information of the vehicle passing through the road surface; the information of the vehicle includes speed information, steering information and weight information of the vehicle; each group of the speed information, the steering information and the weight information of the vehicle form a data set and is stored in the storage module, that is, after the vehicle passes through the pit, the information of the vehicle passing through the pit is recorded; the storage module is internally provided with a safety area, a transition area and a dangerous area; vibration information of the vehicle passing through the road surface safely is calibrated, a calibration value is T0, and threshold values T1 and T2 are set, wherein T1<T2; and the information of the vehicle passing through the pit is stored in different areas according to the threshold value.

When T0≤T1, the information of the vehicle is stored in the safety area of the storage module.

When T1<T0<T2, the information of the vehicle is stored in the transition area of the storage module.

When T0≥T2, the information of the vehicle is stored in the dangerous area of the storage module.

The vision acquisition system further includes a comparison module.

The information of the vehicle is acquired.

The vehicle weight acquisition module acquires weight information of the vehicle, and marks the weight information as m1.

The vehicle speed acquisition module acquires speed information of the vehicle, and marks the speed information as V3.

The image acquisition module can acquire the distance from the front end of the vehicle to the point A, and marks the distance as H3.

When there is a pit in front of the vehicle, m1, V3 and H3 are compared with the data set in the storage module so as to output the data set information same as/similar to the data of the vehicle in the safety area, and the vehicle is controlled by the outputted data set information.

By acquiring the vehicle data, the suitable data set information for the vehicle to pass through the front pit is screened out by comparing the information of the with the data set information in the storage module, and the vehicle is controlled by the selected data set information, so that the calculation amount of the calculation module is reduced.

The vision acquisition system further includes a feature selection module; the feature selection module is used for limiting the outputted data set information, including the data set information when the vehicle passes through the pit safely at a maximal speed, or the data set information when the vehicle passes through the pit safely with minimal vehicle vibration, or the data set information when the vehicle passes through the pit safely at minimal steering.

It should be noted that relationship terms of first, second and the like herein are just used for differentiating one entity or operation from the other entity or operation, and do not necessarily require or imply any practical relationship or sequence between the entities or operations. Moreover, terms of "comprise", "include" or any other variant are intended to cover non-exclusive inclusion, so that a process, a method, an article or a device which includes a series of elements not only includes such elements, but also includes other elements not listed clearly or also includes inherent elements in the process, the method, the article or the device.

Although the embodiments of the present invention have been shown and described, it will be appreciated that various variations, amendments, replacements and modifications can be made by those ordinary skilled in the art without departing from the principle and spirit of the present invention, and the scope of the present invention is limited by the appended claims and the equivalents thereof.

We claim:

1. A vision acquisition system equipped in an intelligent terminal of a smart logistics vehicle, comprising a camera and one or more processors configured for performing units comprising:

an image information acquisition unit comprising a ground image acquisition module and a feature point identification module; wherein the ground image acquisition module acquires a ground image in front of a vehicle through the camera; and the feature point identification module is used for identifying contour information of the image and marking a near point and a far point of the image;

an angle information acquisition unit comprising an angle control module and an angle acquisition module; wherein the angle control module is used for controlling an inclination angle of the camera; and the angle acquisition module is used for acquiring the inclination angle of the camera;

a vehicle information acquisition unit comprising a vehicle speed control module, a vehicle speed acquisition module, a vehicle weight acquisition module and a vehicle steering control module; wherein the vehicle speed control module is used for controlling a speed of the vehicle, comprising braking and acceleration of the vehicle; the vehicle speed acquisition module is used for acquiring a real-time speed of the vehicle; and the vehicle steering control module is used for controlling the steering of the vehicle;

an image information analysis unit comprising an image analysis module and a distance measurement module; wherein the image analysis module is used for analyzing whether there is a pit on the ground image; and the distance measurement module is used for measuring distances from the near point and the far point to a front portion of the vehicle;

a calculation unit comprising a vehicle speed calculation module and a camera inclination angle calculation module; wherein the vehicle speed calculation module is used for calculating a driving speed of the vehicle; and the camera inclination angle calculation module is used for calculating the inclination angle of the camera, wherein the image analysis module of the image acquisition module can also calibrate the pit on the ground, a calibration value is B, and threshold values are set as C1 and C2 according to a width of the pit;

when B≤C1, it means that the vehicle can pass through the pit without slowing down;

when C1<B<C2, it means that the vehicle can pass through the pit by slowing down;

when C2≤B, it means that the vehicle can bypass the pit by steering.

2. The vision acquisition system equipped in the intelligent terminal of the smart logistics vehicle according to claim 1, wherein when the vehicle can pass through the pit by slowing down, the near point is marked as a point A, and the far point is marked as a point B;

the distance from the point A to a front end of the vehicle is marked as H1;

the driving speed of the vehicle is marked as V1, and the speed of the vehicle safely passing through the pit is marked as V2;

a braking distance of the vehicle is marked as X, so X≤H1;

a friction force provided by the vehicle is F, and the vehicle speed calculation module is internally preset with a following algorithm:

$$F1 = \frac{(V2-V1)^2}{X} \times m,$$

wherein m is a mass of the vehicle,
so that the friction force provided by the vehicle is that F≥F1.

3. The vision acquisition system equipped in the intelligent terminal of the smart logistics vehicle according to claim 2, wherein the camera inclination angle calculation module is preset with the following algorithm, $$H2 = \frac{V1^2}{F} \times m$$

wherein H2 is the distance from the front end of the vehicle to the point A when the vehicle speed is V1;
the camera inclination angle calculation module is also internally preset with the following algorithm, $$\cos\theta = \frac{b^2 + c^2 - H2^2}{2bc},$$

wherein b is a height of the camera from the ground;
c is a distance from the camera to the point A;
θ is an included angle between b and c, i.e., an included angle between the camera and a vertical direction;
the camera inclination angle calculation module is also internally preset with the following algorithm, $$c = \sqrt{H2^2 + b^2},$$

and the angle control module controls the inclination angle of the camera to be not less than θ.

\* \* \* \* \*